US009329937B1

(12) United States Patent
Grant et al.

(10) Patent No.: US 9,329,937 B1
(45) Date of Patent: May 3, 2016

(54) HIGH AVAILABILITY ARCHITECTURE

(71) Applicant: GOOGLE INC., Mountain View, CA (US)

(72) Inventors: Brian Grant, San Carlos, CA (US); John Wilkes, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 36 days.

(21) Appl. No.: 14/145,177

(22) Filed: Dec. 31, 2013

(51) Int. Cl.
*G06F 9/48* (2006.01)
*G06F 9/50* (2006.01)
*G06F 11/14* (2006.01)

(52) U.S. Cl.
CPC ............ *G06F 11/14* (2013.01); *G06F 9/5005* (2013.01); *G06F 9/4806* (2013.01); *G06F 9/4881* (2013.01); *G06F 9/5061* (2013.01); *G06F 9/5083* (2013.01)

(58) Field of Classification Search
None
See application file for complete search history.

(56) References Cited

U.S. PATENT DOCUMENTS

| | | | | |
|---|---|---|---|---|
| 8,381,214 | B2* | 2/2013 | Theimer et al. | 718/102 |
| 8,386,508 | B2* | 2/2013 | Krishnamoorthy et al. | 707/764 |
| 8,776,065 | B2* | 7/2014 | Podila | 718/102 |
| 8,977,898 | B1* | 3/2015 | Veeraswamy | G06F 11/14 714/15 |
| 9,030,953 | B2* | 5/2015 | Purohit | 370/252 |
| 9,128,771 | B1* | 9/2015 | Garg | G06F 9/5005 |
| 2007/0011681 | A1* | 1/2007 | Shu | G06F 9/4881 718/102 |
| 2007/0294697 | A1* | 12/2007 | Theimer et al. | 718/102 |
| 2008/0120619 | A1* | 5/2008 | Podila | 718/102 |
| 2009/0271385 | A1* | 10/2009 | Krishnamoorthy et al. | 707/4 |
| 2012/0023366 | A1* | 1/2012 | Horii et al. | 714/15 |
| 2012/0137006 | A1* | 5/2012 | Minato | G06F 9/5083 709/226 |
| 2012/0173709 | A1* | 7/2012 | Li | G06F 9/5061 709/224 |
| 2012/0224691 | A1* | 9/2012 | Purohit | 380/255 |
| 2013/0198760 | A1* | 8/2013 | Cuadra et al. | 718/106 |
| 2013/0305087 | A1* | 11/2013 | Catthoor | G06F 11/14 714/15 |
| 2014/0082415 | A1* | 3/2014 | Schlarb | G06F 11/14 714/15 |
| 2014/0282582 | A1* | 9/2014 | Clark | G06F 9/4806 718/104 |

OTHER PUBLICATIONS

Yeow, W-L., et al., Designing and Embedding Reliable Virtual Infrastructures, Proceedings of the second ACM SIGCOMM workshop on Virtualized infrastructure systems and architectures, 2010, pp. 33-40, [retrieved on Dec. 22, 2015], Retrieved from the Internet: <URL:http://dl.acm.org/>.*

Tikotekar, A., et al., On the Survivability of Standard MPI Applications, International Conference on Linux Clusters: The HPC Revolution, 2006, 15 pages, [retrieved on Dec. 22, 2015], Retrieved from the Internet: <URL:http://citeseerx.ist.psu.edu/viewdoc/summary?doi=10.1.1.104.5828>.*

* cited by examiner

Primary Examiner — Thuy Dao
Assistant Examiner — Geoffrey St Leger
(74) Attorney, Agent, or Firm — Lerner, David, Littenberg, Krumholz & Mentlik, LLP

(57) ABSTRACT

A system for executing tasks in a computing resource environment is disclosed. Variations of a system may include two or more scheduler partitions associated with respective schedulers, scheduler state information, and respective plurality of computing resources. Variations of a system may include a task distributor that distributes tasks to the scheduler partitions. In some variations, one scheduler is configured such that, responsive to the scheduler partition receiving a task from the distributor, that scheduler allocates a computing resource for execution of that task and updates its scheduler state information accordingly. In some variations, the task distributor is configured such that, if one scheduler is in a failed or corrupted state, the task distributor stops distributing tasks to that scheduler partition and prevents that scheduler state information from propagation to, or access by, other scheduler partitions.

26 Claims, 5 Drawing Sheets

HIGH AVAILABILITY ARCHITECTURE

BACKGROUND

Today increasingly, a complex large-scale computing environment is composed of multiple systems. These systems are independently developed and interact with each other, as well as interact with the user(s). Each of these systems in the environment manages a great number of resources, which may include hardware devices, applications, and a range of other components and capabilities needed for system and resource management. Techniques such as load balancing may be employed to ensure that no particular resource or resource group is over-used or too heavily relied upon, however this may lead to difficulties in highly available systems.

A challenge in highly available systems is to not only mitigate the impact of physical failures and maintenance, but also to defend against software, application, and resource management failures.

A highly available system may, in the case of a complete or partial failure or system corruption or crash, immediately "fail over" or otherwise move or re-allocate processes and workloads from failed or compromised computing resources to healthy ones. In the case of crashes or failures or other system compromises arising from software bugs or otherwise faulty or corrupt system states, such "fail over" may trigger a cascading failure of an entire system.

SUMMARY

In some embodiments of solutions discussed herein, a complex large-scale computing environment is composed of multiple systems. Such an environment may therefore be thought of, in some cases, as a system-of-systems. Such an environment may have one or more resource schedulers that manage system resources and allow various system tasks to utilize or access those resources or otherwise allocate system resources to perform certain tasks or functions.

In view of the foregoing, it is desired to provide or define a systematic way of allowing a resource scheduling system to scale and continue operation even in the face of partial failures and even if those failures corrupt a state or otherwise "contaminate" any part or portion of the resource scheduling system. In some embodiments, such "contamination" may be caused by a change to the state that causes components reading or updating the state to fail or otherwise malfunction, such as due to the state being invalid or triggering bugs in the components.

The foregoing objectives can be realized, in some embodiments, by dividing an overall scheduling system for a large-scale computing environment into compartmentalized partitions. Tasks may then be distributed among and across the partitions and the compartmentalized scheduling systems are then able to bind the tasks to specific resources such as physical or virtual machines.

Advantages of such an approach include the ability to isolate software failures or software-initiated failures within a particular compartmentalized partition. A contamination or an explosion of the compartmentalized scheduler's state is therefore only likely to affect one partition at a time. An embodiment of an explosion of the state may include a growth in state size such that it becomes too large to process in the budgeted or allocated resources. Such growth in state size may lead to component and/or system failure or degradation of performance to unacceptable or unusable levels. Such embodiments may impact only a fraction of the tasks that would otherwise be affected by a cascading failure in an un-partitioned scheduling system. Such embodiments may decouple the size of the scheduling domain from the sizes of the software failure domains, allowing scaling of the size of the scheduling domain while maintaining availability.

Embodiments of techniques and solutions and systems described herein may be applicable in a computing resource environment including one or more systems or groupings of resources. In embodiments of such an environment, solutions, techniques, and systems described herein may include a system for executing tasks in a computing resource environment, the system comprising: a first scheduler partition, the first scheduler partition being associated with a first scheduler, first scheduler state information, and first plurality of computing resources; a second scheduler partition, the second scheduler partition being associated with a second scheduler, second scheduler state information, and a second plurality of computing resources; and a task distributor configured to distribute tasks to the first and second scheduler partitions; the first scheduler being configured such that, responsive to the first scheduler partition receiving a task from the task distributor, the first scheduler allocates a computing resource for execution of the received task and updates the first scheduler state information accordingly; and the task distributor being configured such that, responsive to a determination of the first scheduler state information indicating that the first scheduler is in a failed or corrupted state, the task distributor stops distributing tasks to the first scheduler partition and prevents the first scheduler state information from propagation to, or access by, the second scheduler partition.

In some embodiments, the task distributor is configured to: identify a first task as a fault-tolerant task meant to tolerate scheduler failures; distribute the identified first task to the first scheduler partition; and distribute a first replicated task, the first replicated task being a replica of the identified task, to the second scheduler partition.

In some embodiments, the system includes a source of task routing information and the distributor is configured to distribute tasks to the scheduler partitions based on the task routing information.

In some embodiments, the distributor is configured to update the task routing information based on the scheduler state information associated with the respective scheduler partitions; and in response to determining that the first scheduler state information indicates that the first scheduler is in a failed or corrupted state, the distributor updates task routing information to indicate that the first scheduler partition may not receive distributed tasks from the distributor.

In some embodiments, the task routing information includes a distribution key associated with each task to be distributed by the distributor; and the distributor is configured to distribute tasks based on a distribution sequence indicated by the distribution key of each task.

In some embodiments, the first plurality of computing resources includes a plurality of machine sets, each machine set representing computing resources associated with or based on at least one hardware component of a computing device.

In some embodiments, the distributor is configured to distribute tasks to the first and second scheduler partitions based on a respective resource utilization level in the first and second scheduler partitions, the resource utilization level of a scheduler partition being indicated based on the scheduler state information associated with that scheduler partition.

In some embodiments, the first scheduler state information includes information about resource outages occurring in the first plurality of computing resources.

In some embodiments, the distributor is configured to distribute tasks to the scheduler partitions based on a respective computing capacity of each scheduler partition, the computing capacity of a scheduler partition being determined based on the scheduler state information.

In some embodiments, the scheduler state information includes information about a total number of tasks being executed within the scheduler partition and a total computing resource usage level associated with the tasks being executed from among the first plurality of computing resources.

In some embodiments, the system includes a third scheduler partition, the third scheduler partition being associated with a third scheduler, third scheduler state information, and a third plurality of computing resources; and in response to determining that the first scheduler state information indicates that the first scheduler is in a failed or corrupted state, the distributor stops distributing tasks to the first scheduler partition and prevents the first scheduler state information from being propagated to or accessed by the second or third scheduler partitions.

In some embodiments, each scheduler partition is configured to be internally fault tolerant such that an outage of a computing resource allocated for execution of a task within a scheduler partition causes the scheduler to allocate a new computing resource for execution of that task.

In some embodiments, each scheduler partition is configured to be isolated from the other scheduler partitions such that scheduler state information, tasks, and resources associated with a scheduler in a corrupted or failed state are prevented from being propagated to the other scheduler partitions In some embodiments, the remaining instances tasks replicated across two or more scheduler partitions are updated in response to a scheduler of one of said two or more scheduler partitions being in a failed or corrupted state.

In some embodiments, the first scheduler partition is uniquely associated with the first scheduler; and the second scheduler partition is uniquely associated with the second scheduler.

Some embodiments of solutions, techniques, and systems described herein may include a method of preventing cascading scheduler failures in system for executing tasks in a computing resource environment, the method comprising: distributing a first task from a task distributor to one of at least a first scheduler partition and a second scheduler partition in the computing resource environment; in response to receiving the first task from the task distributor, allocating, with a first scheduler of the first scheduler partition, a computing resource for execution of the received first task from among a first plurality of computing resources associated with the first scheduler partition; in response to said allocating, updating, with the first scheduler, first scheduler state information, the updated first scheduler state information being indicative of a state of the first scheduler, the received first task, and the allocated computing resource after said allocating; in response to determining that the first scheduler state information indicates that the first scheduler is in a failed or corrupted state, stopping distribution of tasks by the distributor to the first scheduler partition; and preventing the first scheduler state information from being propagated to or accessed by the second scheduler partition, the second scheduler partition being associated with a second scheduler and a second plurality of computing resources.

In some embodiments, distributing a first task from a distributor includes distributing the first task to the first scheduler partition based on task routing information.

In some embodiments, method includes: updating the task routing information based on the updated first scheduler state information; and in response to determining that the first scheduler state information indicates that the first scheduler is in a failed or corrupted state, updating the task routing information to indicate that the first scheduler partition may not receive distributed tasks from the distributor.

In some embodiments, distributing a first task from a distributor includes: distributing the first task to one of the first and second scheduler partitions based on a respective resource utilization level in the first and second scheduler partitions, the resource utilization level of a scheduler partition being indicated based on scheduler state information associated with that scheduler partition.

In some embodiments, the first scheduler state information includes information about resource outages occurring in the first plurality of computing resources.

In some embodiments, distributing a first task from a distributor includes: distributing the first task to one of the first and second scheduler partitions based on a respective computing capacity of each scheduler partition, the computing capacity of a scheduler partition being determined based on the scheduler state information associated with that scheduler partition.

In some embodiments, the scheduler state information includes information about a total number of tasks being executed within a particular scheduler partition and a total computing resource usage level associated with the tasks being executed from among a plurality of computing resources associated with the particular scheduler partition.

In some embodiments, the method further includes: in response to determining that the first scheduler state information indicates that the first scheduler is in a failed or corrupted state, preventing the first scheduler state information from being copied to or accessed by a third scheduler partition, the third scheduler partition being associated with a third scheduler and a third plurality of computing resources.

In some embodiments, each scheduler partition is configured to be internally fault tolerant such that an outage of a computing resource allocated for execution of a task within a scheduler partition causes the scheduler to allocate a new computing resource for execution of that task; and each scheduler partition is configured to be isolated from the other scheduler partitions such that scheduler state information, tasks, and resources associated with a scheduler in a corrupted or failed state are prevented from being propagated to the other scheduler partitions.

In some embodiments, the method further includes: updating remaining instances tasks replicated across two or more scheduler partitions in response to a scheduler of one of said two or more scheduler partitions being in a failed or corrupted state.

In some embodiments, distributing a first task from a distributor includes: identifying the first task as a fault-tolerant task meant to tolerate scheduler failures; replicating the identified first task by creating a first replicated task; distributing the identified first task to the first scheduler partition with the distributor; and distributing the first replicated task to the second scheduler partition with the distributor.

Some embodiments of solutions, techniques, and systems described herein may include a system for executing tasks in a computing resource environment, the system comprising: a first scheduler partition, the first scheduler partition being uniquely associated with a first scheduler, first scheduler state information, and a first plurality of computing resources; a second scheduler partition, the second scheduler partition being uniquely associated with a second scheduler, second scheduler state information, and a second plurality of computing resources; a third scheduler partition, the third scheduler partition being uniquely associated with a third scheduler, third scheduler state information, and a third plurality of computing resources; and a task distributor configured to distribute tasks to the first and second scheduler partitions and to determine a state of a scheduler partition based on the scheduler state information of that scheduler partition; the first, second, and third scheduler partitions being configured such that each scheduler and scheduler partition may exchange information with the task distributor, and no scheduler or scheduler partition may directly transmit scheduler state information to or receive scheduler state information directly from any other scheduler or scheduler partition; the first scheduler being further configured such that, responsive to the first scheduler partition receiving a task from the task distributor, the first scheduler allocates a computing resource for execution of the received task and updates the first scheduler state information accordingly; and the task distributor being configured such that, responsive to a determination of the first scheduler state information indicating that the first scheduler is in a failed or corrupted state, the task distributor stops distributing tasks to the first scheduler partition and prevents the first scheduler state information from propagation to, or access by, the second or third scheduler partitions.

Some embodiments of solutions, techniques, and systems described herein may include one or more of a non-transitory computer-readable storage medium or a system including a processor and a processor-readable storage medium, the storage medium having embodied thereon instructions for performing one or more of the methods or method steps described above and variations thereon.

Embodiments of some or all of the processor and memory systems disclosed herein may also be configured to perform some or all of the method embodiments disclosed above. Embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein and the accompanying drawings that are given by way of illustration only and thus are not limitative.

Figure 1:
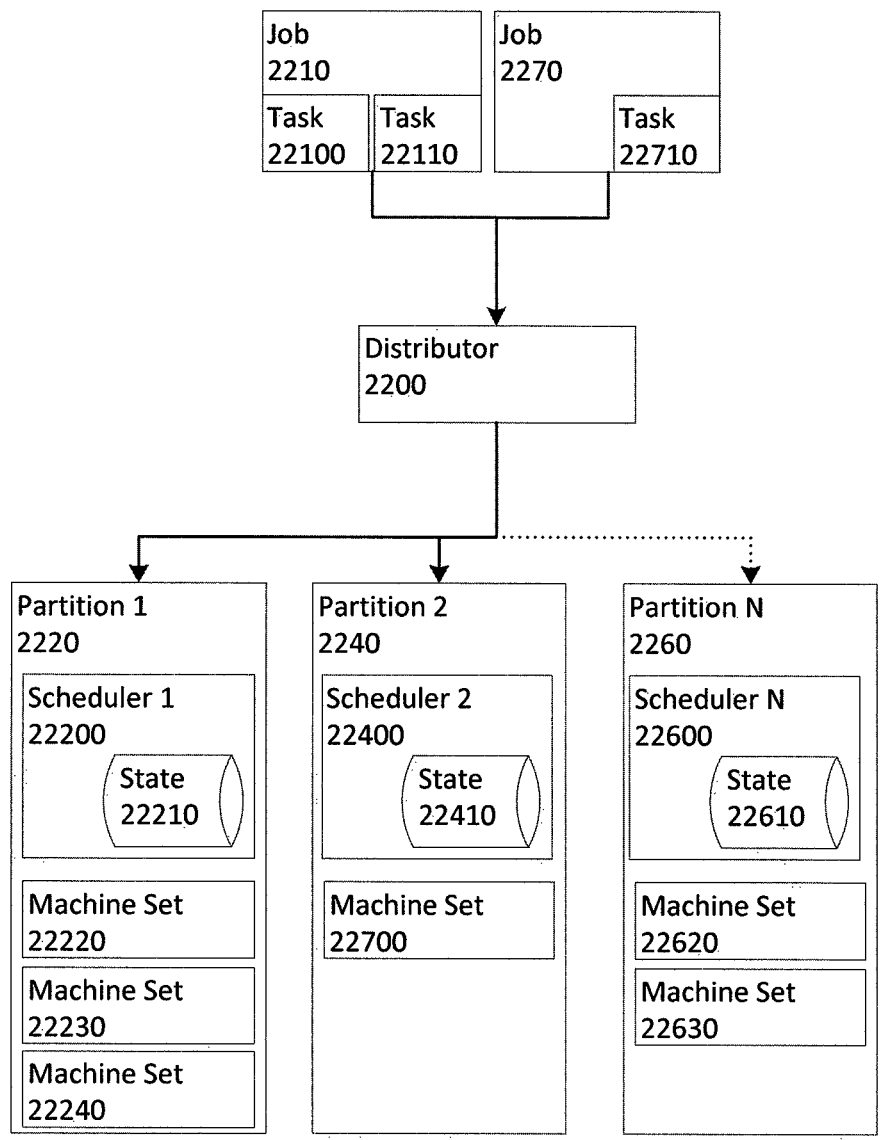
FIG. 1 shows a block diagram representing an embodiment of a partitioned scheduler system in a computing resource environment as described herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

DEFINITIONS within the context of this document, the following terms will have meanings consistent with the definitions set forth below.

a. Resource: a physical or logical component of a computing system or computing environment or a data item or data collection stored in or accessed by a computing system or computing environment. A "resource" can be specifically identified for purposes of access, processing, tracking, control, or other uses within a system by means of a data structure, logical object, or other structured information representing the resource and/or its inherent or associated properties. Examples of resources include: running processes, applications, physical storage locations, virtual machines, processors, process threads, processor access time, memory, storage space, network bandwidth, storage access time, databases, database entries, and other system objects and/or components.

b. Scheduler: a system, hardware, software, application, or combination thereof that allocates or offers resources to tasks and jobs that request or require those resources in order to be executed or completed or otherwise performed. An offer is when one or more resources are indicated as available, or "offered", by a resource scheduler to fulfill a particular resource request. In some embodiments, an offered resource may be claimed by or for the resource request, thereby causing the resource to be claimed by, or allocated to, the resource request.

c. Offer: an offer represents specific resource(s) being made available for a specific time period. An offer may refer to resource(s) on a single physical entity (e.g., a single machine, RAID, network switch, etc.) or a logical/virtual entity (e.g. a virtual machine, database, etc.) or on multiple physical or virtual/logical entities (e.g. a database, database system, or group of databases spanning multiple physical storage locations).

d. Claim: a claim is a reservation of resource(s) for a specific period of time.

e. Task: a unit of work. A workload (e.g., a service, or a data processing pipeline) may be comprised of multiple tasks. Tasks may be of different forms, depending on the kind of workload. Examples of tasks may include process groups, servlet instances, data shards, build steps, arithmetic operations, database queries, information transmission, data processing or other operations involving reading, writing, generating, updating, retrieving, storing, processing, or transmitting data within a computing resource environment.

f. Job: a particular higher-level operation to be carried out within a computing resource environment, such as execution of a particular operation within an application or responding to data requests or inputs from other actors within or interacting with the computing resource environment or portions thereof, or an instance of a workload or portion of a workload, such as a service tier, data processing stage, or batch job. A job may be represented by a group or plurality of tasks.

An embodiment of a fault-tolerant scheduling system for a computing resource environment is shown in FIG. 1. In the embodiment shown, three compartmentalized partitions 2220 2240 2260 are depicted. Although three compartmentalized partitions are shown, such a system may employ anywhere between 2 and N partitions, with N being an arbitrarily large integer. Each partition 2220 2240 2260 may be associated with its own scheduler 22200 22400 22600 that handles resource scheduling, managing offers and claims, and other tasks related to matching and scheduling resources and tasks appropriately and effectively.

An embodiment of a partition 2220 may include one or more machine sets 22220 22230 22240. A machine set 22220 includes a set of resources such as, for example, one or more physical machines, storage arrays, server racks, network switches, or other hardware devices. In some embodiments, a machine set 22220 may be accessed either directly or through one or more resource pools (not shown) that may represent one or more physical or logical functional portions included in the machine set.

In some embodiments, each partition 2220 2240 2260 may also include information indicating a state 22210 22410 22610 of itself and/or its associated scheduler. The state information may enable a task distributor 2200 to determine the health of a partition and, in some embodiments, to determine the health of a scheduler associated with that partition.

In some embodiments, a health determination for a scheduler partition may be determined based, at least in part, on a number of properly functioning machine sets or resources derived from the machine sets, network reachability of the partition or components therein, status of networking components, status of power hierarchy components, direct or indirect scheduler responsiveness, and known or scheduled maintenance periods. In some embodiments, a measure of partition health may include an indication of an amount of resource-based functionality or a number or level of resources in a state of outage or other condition of non-function or unusability as compared to a total amount of resources, resource-based functionality, or number or level of resources. In some embodiments, a health determination for a scheduler may include a load amount or level associated with the scheduler based on a number or level of tasks and related resources being managed by that scheduler. In some embodiments, a health determination for a scheduler may be based on or determined by a number of suspended, evicted, to-be-evicted, crashed, corrupted, or otherwise stopped, to-be-stopped, and/or malfunctioning tasks being managed by that scheduler.

In some embodiments, a distributor 2200 may receive one or more jobs 2210 2270 or job requests. An embodiment of a job may include one or more tasks 22100 22110 22710. The distributor 2200 may distribute the jobs 2210 2270 and/or the tasks 22100 22110 22710 from those jobs to one or more of the partitions 2220 2240 2260. A scheduler 22400 in that partition 2240 may then schedule computing system resources from the machine set(s) 22700 included in that partition 2240 for execution of a particular job or task.

In some embodiments, the distributor 2200 may distribute or divide jobs by a variety of techniques, such as auto-scaling based on partition latency, load-balancing techniques, or by dividing a job into a specified number of tasks based on a configuration or a request or according to a number of tasks specified by a default value or a heuristic. In some embodiments, the number of tasks of a job may be determined by the user or by another system (e.g., horizontal auto-scaler) or tool (e.g., resource planning tool using load test results as input).

In some embodiments, the number of tasks of a job may be driven by resource scalability instead of, or in addition, to resource availability. Some embodiments handing extremely small (e.g., 1-task) jobs or shards of jobs, where replication may be needed in order to achieve a minimum level of availability, may not be driven by scalability concerns. In some embodiments, jobs that aren't stateless may not be able to be replicated arbitrarily. For example, voting schemes may require an odd number of replicas.

In some embodiments, some number of instances may be provided or otherwise indicated to the scheduler or scheduling system. The scheduling system may also be informed about a level of availability associated with or required by the task given the number of instances or replicas. In some embodiments, a default or minimum level of availability may be configured or otherwise designed into a scheduling system for scenarios where a level of availability is not provided or where a provided level of availability is below the designed or configured minimum scheduling system level.

In some embodiments, an auto-scaler or other utility may determine a number of tasks based on an amount of work to be done, an amount of available resources, a desired deadline or defined work/duration period, application service time latency, application request queue length, application throughput, resource utilization by the application, or other related metrics or measures of performance or utilization or execution parameters.

In some embodiments, no job 2210 may be specified and instead the individual tasks 22100 may be specified directly. In some embodiments, a job 2210 may require fault tolerance or may include one or more tasks 22100 that require fault tolerance. Such fault tolerant jobs or tasks may be divided or spread or replicated by the distributor 2200 among multiple partitions 2220 2240 2260 according to a variety of techniques, such as according to the computing power and/or expected uptime of a particular partition or by actual available resources in each partition, or weighted by nominal max. available resources of each partition, or by estimated partition failure rate, or by number of independent failure domains in each partition, or by number of scheduled tasks in each partition. In some embodiments, down and soon-to-be-down partitions may be excluded.

In some embodiments, tasks may be labeled by "distribution key(s)". In some embodiments, a distribution key may be represented by the job 2210 to which the tasks 2210 22110 belong. For instance, in a situation where tasks 22100 and 22110 are labeled with job 2210 as a distribution key. Such a distribution key may allow for sequential or other organized submission of the tasks to the distributor by limiting the number tasks having a particular distribution key that can be submitted simultaneously or within a particular time window.

In some such embodiments, a probability of correlated failure of individual and/or multiple partitions (for example, of both the schedulers and individual machines) may determine how many partitions may be needed to distribute the tasks among. In some embodiments, such a probability may be used to determine a maximum permitted or preferred number or proportion of tasks distributed to any single partition. Such information may be used to decide or determine tradeoffs between fault tolerance and performance cost of lost locality. Some embodiments may employ the strategy of distributing the tasks amongst all available partitions within the degree of network locality required.

In some embodiments, a distributor may decide how many tasks 22100 of a given job 2210 should be assigned to a particular partition 2220 from among the multiple partitions 2220 2240 2260 for scheduling. In some such embodiments, a distributor may assign tasks based on one or more risk allocation schemes associated with a task 22100, job 2210, and/or based on known or estimated failure risks of the partitions 2220 2240 2260. Embodiments of such task assignment may be aimed at avoiding or reducing susceptibility of tasks to correlated failure due to failure of an associated software or physical domain.

In some embodiments, a scheduler 22600 may provide a measure of fault tolerance within a partition 2260. In such embodiments, a task (not shown) that is utilizing one or more resources from the machine set(s) 22620 22630 associated with the partition 2260 may be scheduled onto different resources (not shown) by the scheduler 2260 in the event one or more of the resources initially scheduled to the task becomes unavailable. A resource within a partition 2260 may become unavailable for a variety of reasons, including being claimed by a higher-priority task, underlying hardware failure, software failure, power failure, hardware or software upgrade, data corruption, maintenance, replacement, or by the machine being over-committed, meaning that tasks may need to be re-assigned to other available resource or that resources may be reallocated to new purposes.

In some embodiments, a software failure or data corruption, such as one caused by a malfunctioning or defective job or task being executed in a scheduler partition or by a job or task exercising defective system features in the scheduler partition, may cause the state 22210 of the partition to become corrupted or unstable or otherwise indicative of a failure within the scheduler 2220. Some such embodiments may include scenarios such as a task that modifies or otherwise corrupts data in memory locations associated with fundamental system applications. In some embodiments, such a task may corrupt a persistent and/or in-memory state of the scheduler and/or of one or more on-machine agents (not shown) responsible for starting, managing, and/or monitoring tasks.

In some embodiments, a partition state may become corrupted or a partition failure may be otherwise caused by a software or configuration update (e.g., of the scheduler or of on-machine agents). In some embodiments, latent or newly introduced bugs may cause the quantity of state managed by the schedule to exceed the amount it is capable of handling (e.g., if a garbage-collection or task termination bug is introduced or tickled). In some embodiments, a denial of service attack may cause the quantity of state to exceed manageable levels.

In some embodiments where a scheduler 22400 associated with a partition 2240 fails, the distributor 2200 may receive an indication of such scheduler 22400 failure based on the state information 22410 stored in or associated with the partition 2240. Upon determining that the scheduler 22400 is in a failure state, the distributor 2200 stops distributing or replicating or otherwise directing jobs or tasks to the failed partition 2240. In some embodiments, the distributor 2200 may also ensure that the partition 2240 and failed scheduler 22400 remain isolated from the other scheduler(s) 22200 22600 and partition(s) 2220 2260 that receive jobs or tasks from that distributor 2200.

Embodiments of such a failure isolation configuration prevent cascading failures throughout the computing resource environment that may otherwise be triggered as a result of fail-over of a scheduler in a corrupt or "toxic" state. Whereas a typical high availability or load-balancing solution may include replication or re-distribution of the tasks and associated resource allocations being managed by the failed scheduler 2240 at the time of failure, embodiments of the techniques discussed herein instead isolate the failed scheduler 2240 and sequester its state information 22410 from other schedulers.

In some embodiments, such isolation and sequestering may be realized based on a system configuration that keeps the individual scheduler partitions isolated from each-other and only allows inter-partition or inter-scheduler communication with respect to tasks to occur indirectly via the distributor. In some such embodiments, versions of a task that is replicated across multiple schedulers or scheduler partitions may provide information about their respective execution states to the distributor through the scheduler state information or through a known or maintained list or table of replicated tasks. Scheduler state information from one scheduler, however, may not be propagated or otherwise replicated to another scheduler and is instead handled and processed only by the distributor. Such a configuration allows for any one scheduler to become corrupted without causing a cascading failure in the other schedulers while maintaining a high-availability capability in the overall computing environment.

Solutions that replicate or re-distribute task and resource allocation data associated with a corrupted or "toxic" scheduler state 22410 may trigger a series of cascading scheduler failures throughout the computing resource environment as each scheduler failure triggers further distribution or replication of the corrupted state information 22410. By contrast, embodiments of the techniques and solutions discussed herein are directed at preventing such cascading failures in large-scale computing systems and, in some embodiments, in highly-available computing systems.

Embodiments of the type depicted in FIG. 1 may realize high availability through a decentralized job or task scheduling configuration. Such a configuration, coupled with the ability to isolate or otherwise sequester a corrupted or otherwise failed scheduler (and its attendant state information) may allow for embodiments of robust, fault-tolerant, distributed task and resource scheduling solutions for highly available computing resource environments.

Figure 2A:
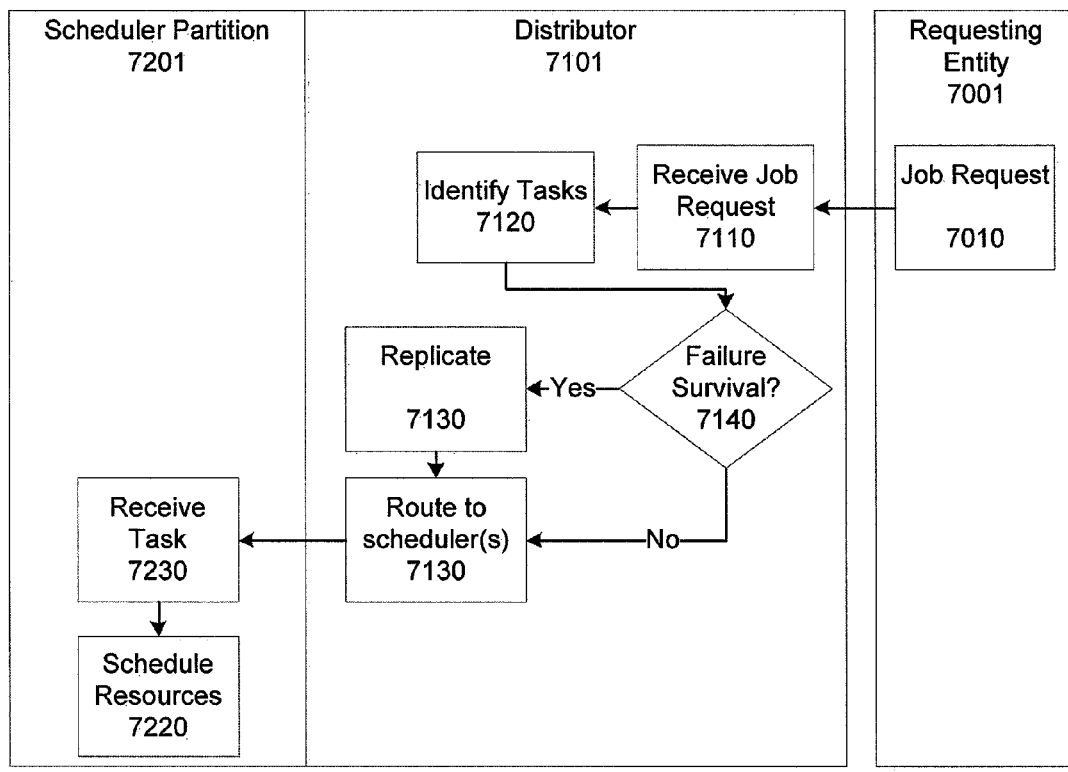
FIG. 2a shows a block diagram representing an embodiment of a task distribution workflow as described herein.

An embodiment of task distribution and scheduling in an embodiment of such a distributed scheduler configuration is depicted in FIG. 2a. In the embodiment shown, a requesting entity 7001, such as an application, database query, computing device, or usage account associated with any of the above, may submit a job or job request 7010 to the computing resource environment through or via a distributor 7010.

In some embodiments, a distributor may include a specially configured computing device, a general-purpose computing device equipped with specialized instructions or programming, portions of one or more computing devices representing a functional or logical unit meant to carry out the distributor function, or one or more virtual machines equipped with specialized instructions. In some embodiments, the distributor 7101 may also include or be associated with or operably connected to one or more data input or output pathways or channels within or associated with the computing resource environment.

Each scheduler 7201 associated with a partition may receive a task 7230 routed 7130 or otherwise directed thereto by the distributor 7101. The scheduler may then schedule resources for task execution from among its pool(s) or set(s) or available resources and/or machines (not shown).

The distributor may receive the job or job request 7110 from the requesting entity 7001 and, in some embodiments, identify the tasks 7120 included in the job request or otherwise decompose or divide the job request into one or more tasks. Each task may then be evaluated to determine whether the task requires failure survival 7140 or fault tolerance. In some embodiments, such a failure survival 7140 evaluation may be made to determine whether an identified task requires failure survival beyond any fault tolerance offered by any one scheduler 7201 within the computing resource environment.

In some embodiments, those tasks requiring failure survival 7140 or fault tolerance beyond any fault tolerance offered by any one scheduler 7201 within the computing resource environment may be replicated 7130 such that two or more replicated versions of a task may be distributed to different schedulers (not shown).

In some embodiments, tasks that don't require fault tolerance may also be replicated or spread among different schedulers. In some embodiments, putting many non-fault-tolerant replicated tasks into a single scheduler partition 7201 may cause that partition to run out of space for spreading fault-tolerant tasks. In some embodiments, such a potential problem may be mitigated by limiting the amount of resources in each partition that could be used by non-fault-tolerant tasks. In some embodiments, such a potential problem may be mitigated by reserving a certain number of partitions for non-fault-tolerant tasks. In some embodiments, the only tasks that may be exempted or precluded from replication or spreading may be tasks for which network locality is extremely important to their performance.

Other reasons to spread or replicate a majority of tasks across multiple schedulers may include simplicity of the distributor (uniform policy), minimizing impact of maintenance on running jobs (which enable faster performance of maintenance operations), and increasing workload diversity of each partition, which can improve early workload exposure for new scheduler releases. In some embodiments, such replication may allow for at least partial completion of a task even in the event one of the replicated task versions is routed 7130 to a scheduler partition 7201 that fails or becomes corrupted. In some embodiments, tasks that are already scheduled may continue to run and restart upon failure even without access to or oversight by the failed scheduler partition 7201.

In some embodiments, a requesting entity 7001 or a distributor 7101 or other system may route one or more "canary" tasks 7130 to a scheduler partition 7201. Such "canary" tasks may include one or more tasks that are initially scheduled in one or more scheduler partitions 7201 to verify that the task(s) will not cause partition failure or correlated partition failures.

Figure 2B:
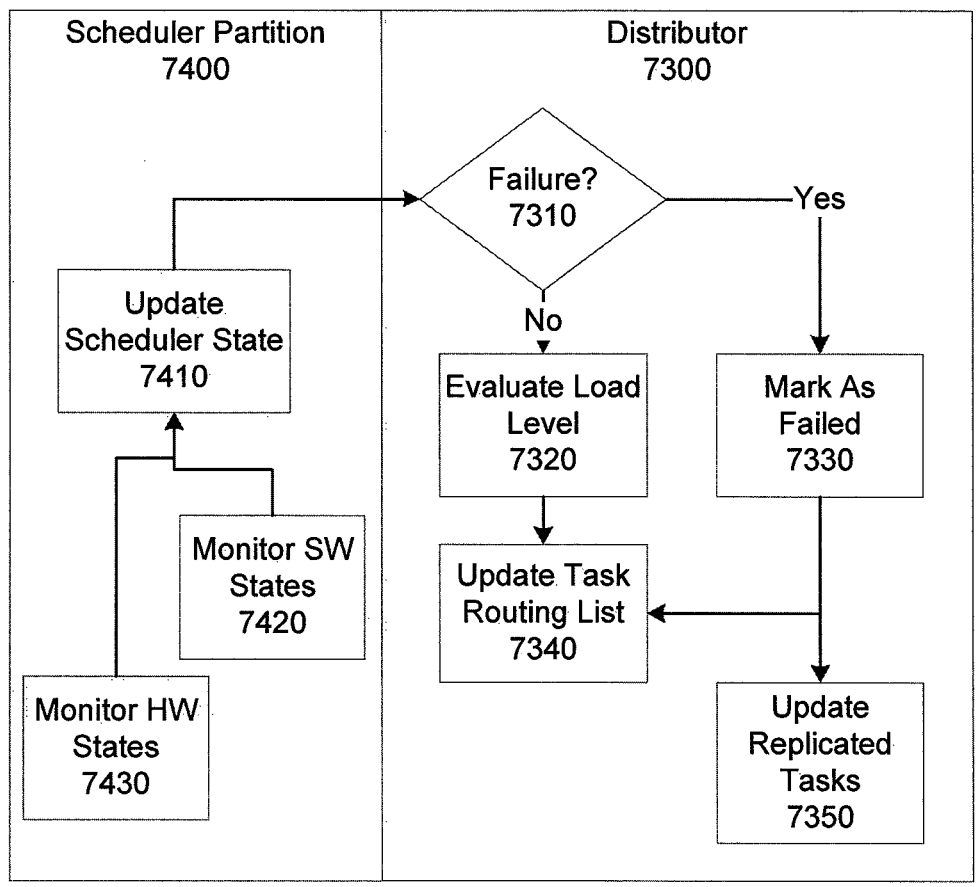
FIG. 2b shows a block diagram representing an embodiment of a scheduler failure workflow as described herein.

An embodiment of detection and handling of a partition failure is depicted in FIG. 2b. In the embodiment shown, a scheduler 7400 associated with a partition may monitor the state(s) 7430 of hardware or hardware-based resources to determine or identify or otherwise provide information related to a resource state indicating a potential failure or corruption or other outage of that resource. In some embodiments, such hardware or hardware-based state information may be included or otherwise reflected in an update to state information associated with the scheduler 7410.

Some embodiments of a scheduler 7400 may also monitor the state(s) 7420 of software or software-based or software-driven resources such as running applications, processor threads, memory allocations, database queries, remote procedure calls, HTTP requests, resource utilization (cpu, memory, disk space and I/O, network), cpu load, and/or paging activity. Such monitoring 7420 may also include monitoring of tasks that have claimed resources for execution. In some embodiments, such software or software-based monitoring information may be included or otherwise reflected in an update to state information associated with the scheduler 7410

The updated information about scheduler state 7410 may be sent to or read by the distributor 7300 to determine if the scheduler 7400 is in a state associated with failure or data corruption such that the scheduler 7400 and its associated partition should no longer receive tasks from the distributor 7300. Embodiments of such information about the scheduler state 7410 may include summary health and status information. In some embodiments, the full state managed by the scheduler is isolated within the partition to avoid subjecting the distributor to the same potential failure modes as the scheduler(s). In some embodiments, if a scheduler is determined to be in a failure state 7310, the distributor 7300 may mark or otherwise indicate that scheduler 7400 as failed 7330.

In some embodiments, a distributor may include or otherwise use or be associated with a task routing list that the distributor may use to make task assignments to schedulers. Marking or otherwise identifying a scheduler partition as failed 7330 may, in some embodiments, cause or entail updating such a task routing list 7340 to reflect the failed scheduler and exclude it from further task assignments while it is in a failed state.

In embodiments involving failure-tolerant or otherwise replicated tasks, the replicated versions of a task whose execution was being managed or otherwise administered by the failed scheduler 7400 may be updated 7350 or otherwise provided with information about the scheduler failure so that the replicated tasks may be modified or changed accordingly to execute those operations being performed in the failed scheduler partition. In some embodiments, a replicated task on a viable or operational scheduler partition may be modified to become a master task in response to failure of a scheduler partition that held the previous master task.

For example, in a situation where there is a physical, persistent power or network failure of the partition 7310, the workload was unlikely to have caused the failure (e.g., by tripping a power breaker). In such a scenario, it is unlikely that the tasks within the partition caused the failure, but the tasks are likely no longer being executed. These tasks can be reassigned to other partitions (not shown).

By contrast, a scenario may occur where the scheduler has failed 7310, but the scheduled tasks are likely functional. In some such situations, as part of marking the partition or scheduler as failed 7330, an alert may be issued or otherwise generated to indicate scheduler failure, but the tasks may be permitted to keep running for some period of time after the scheduler failure. A system operator, monitoring system, sysadmin, or a combination thereof may then decide, based on the generated alert, whether it is safe to reassign tasks to other partitions and/or whether it is possible or desirable to fix the scheduler.

In some embodiments, in response to task failure, load balancers may detect unhealthy tasks and redistribute load to healthy tasks. In some embodiments, failed tasks that were holding master leases may release or fail to renew those leases, enabling other replicas to acquire those leases. Embodiments of automatic sharding systems may reshard data if the cost of doing so is sufficiently low, or they may wait for tasks to be started to replace the failed ones. In some embodiments, the distributor and schedulers need not be directly aware of task management being performed by embodiments of the foregoing mechanisms. In some embodiments, scheduler(s) and/or a distributor may receive resource demand signals, such as the number of tasks currently desired, from one or more of the foregoing task management mechanisms.

In some embodiments, if a scheduler is determined to not be in a failure state 7310, a load level associated with that scheduler partition may be evaluated 7320 by the distributor 7300 and a task routing list may be updated 7340 based on the load conditions of the scheduler 7400 and of any and all other schedulers associated with that distributor 7300.

Figure 2C:
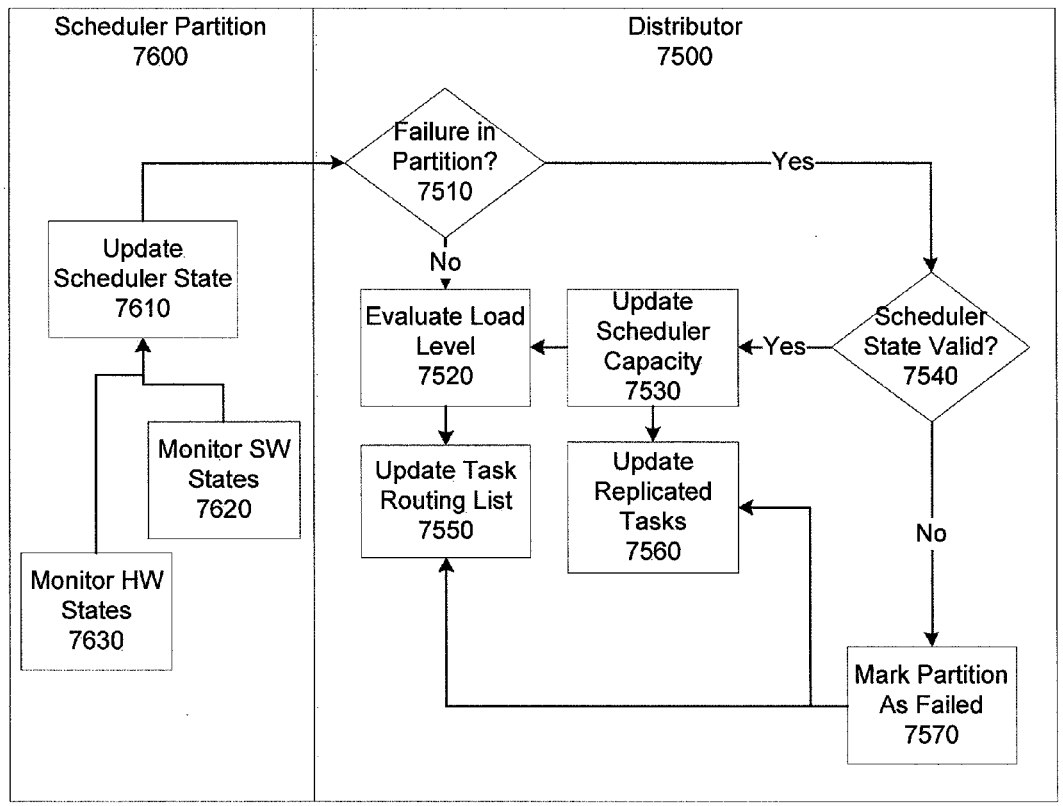
FIG. 2c shows a block diagram representing an embodiment of a scheduler failure workflow as described herein.

In some embodiments, a distributor 7300 may manage and adjust task distribution based not only on a failure state of a scheduler 7400 but also based on failures of resources or resource groups or tasks or task groups being managed by that scheduler 7400. Such an embodiment is shown in FIG. 2c.

In the embodiment shown, a scheduler 7600 associated with a partition may monitor the state(s) 7630 of hardware or hardware-based resources to determine or identify or otherwise provide information related to a resource state indicating a potential failure or corruption or other outage of that resource. In some embodiments, such hardware or hardware-based state information may be included or otherwise reflected in an update to state information associated with the scheduler 7610.

Some embodiments of a scheduler 7600 may also monitor the state(s) 7620 of software or software-based or software-driven resources. Such monitoring 7620 may also include monitoring of tasks that have claimed resources for execution. In some embodiments, such software or software-based monitoring information may be included or otherwise reflected in an update to state information associated with the scheduler 7610

In some embodiments, such updated scheduler state information 7610 may be sent to or read by the distributor 7500, which may then determine whether there is a failure 7510 in the scheduler partition. Such a failure may, in some embodiments, include one or more of a hardware or hardware-based resource failure, a software or software-based resource failure, a task failure, and a failure of the scheduler. In some embodiments, if the updated scheduler state 7610 is indicative of a failure 7510 in the scheduler partition, a subsequent or concurrent evaluation may be performed to determine if the scheduler is in a valid state 7540. If the scheduler is not in a valid state 7540, the scheduler is deemed to be failed 7570 and is quarantined from other schedulers associated with that distributor 7500.

In some embodiments, a scheduler 7600 and its associated partition and state information may be quarantined or otherwise sequestered from other schedulers associated with the distributor 7500 to prevent a cascading failure caused by propagation of a corrupt or invalid scheduler state. In some such embodiments, task routing list(s) may be updated 7550 to indicated that the failed scheduler should not receive further tasks while it is in a failed state.

In some embodiments, tasks which are replicated across two or more schedulers may be updated 7560 to reflect the scheduler failure and partition failure. In some embodiments, if a scheduler fails all the resources of the partition associated with that scheduler become unavailable or are otherwise inaccessible for use in executing tasks. In some embodiments, failure of a scheduler may allow for one or more of the machine sets or underlying hardware of the partition to be redirected or re-allocated to another partition, but the tasks assigned to the partition associated with the failed scheduler (and their related data and state information) may not be propagated or otherwise made visible to any other partition.

In some embodiments, there may be a risk of pulling in toxic state from such reallocated machine sets or hardware. For example, a toxic state could have been generated by software updates to one or more on-machine agents. In such embodiments, re-allocation of machines may be relegated to a manual operation or otherwise prevented until a machine or machine set can be confirmed as not having or including a toxic state.

In some embodiments, the tasks within the partition with the failed scheduler may remain running despite scheduler failure. In some such embodiments, it may be preferable to not immediately reallocate their hardware resources. In some embodiments, a distributor or other hardware management system may be configured to wait for some time period before permitting or attempting reallocation of such machines or machine sets or hardware.

In some embodiments, a partition failure 7510 that does not place the scheduler into an invalid or corrupt state 7540 may cause the distributor 7500 to update or get an updated processing capacity 7530 associated with the scheduler. Such updated processing capacity may be indicative of outages associated with particular resources or resource groups in the partition. In some embodiments, such updated processing capacity information may in turn be used to re-evaluate comparative load levels 7520 among the schedulers associated with the distributor 7500 and to update or otherwise change allocations or master-slave status among one or more replicated tasks 7560. In some embodiments, changes to master-slave status of scheduled tasks may be handled by systems and/or features that receive or acquire comparative load, task routing, and scheduler state information from or through the distributor.

In some embodiments, each time load levels associated with the schedulers are re-evaluated 7520 or otherwise updated at the distributor 7500, a task routing list or table may also be updated 7550. Such a task routing list may, in some embodiments, be utilized by the distributor 7500 to determine where and how to assign tasks to schedulers. Such assignment determinations may also include decisions related to task replication, including a number of replicas and which schedulers to assign which task replicas.

In some embodiments, job and/or task set requests may be sent to different schedulers or even to different distributor instances based on workload characteristics, user IDs, etc. by a proxy or reverse proxy, which could be part of a load balancing system, or in a client library. In some embodiments, all the requests could be distributed via a messaging or publish-subscribe system or "request store". In embodiments distributing tasks among multiple distributor instances, the distributors may act independently. In some embodiments, requests may be broadcast, with each partition then selecting one or more particular tasks to be executed by that partition independently.

Figure 3:
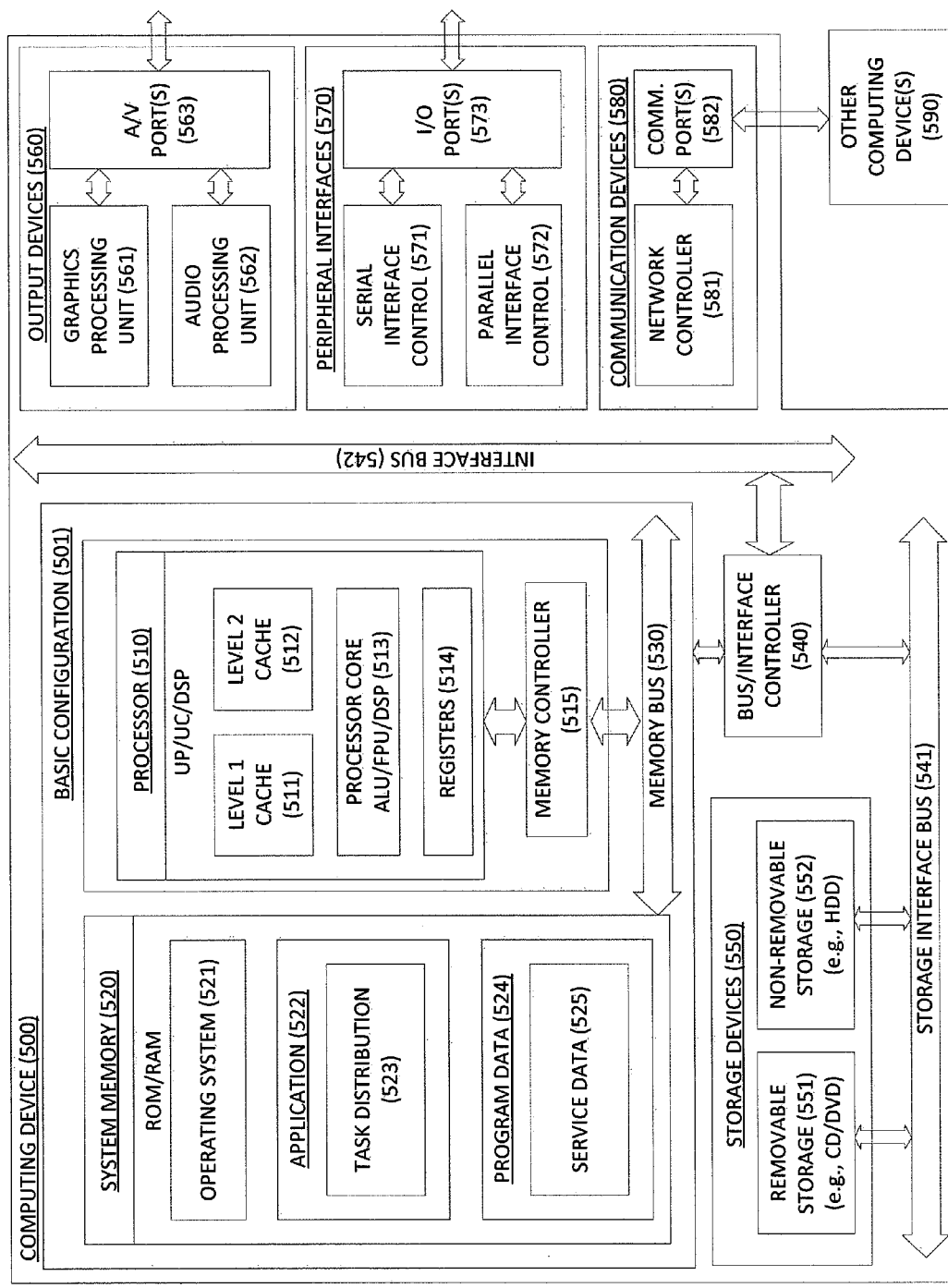
FIG. 3 shows an embodiment of a computing system configured to operate part or all of an embodiment of a computing resource environment as described herein.

Although discussed from a functional standpoint, a distributor and its associated schedulers and partitions may be realized, at least partially, through specifically configured computing devices. FIG. 3 is a block diagram illustrating an example computing device 500 that is arranged to perform task distribution and scheduling techniques as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (µP), a microcontroller (µC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a task distribution or scheduler management feature 523 as discussed herein. Program Data 524 includes location data such as one or more name schemas or object name lists 525 that are useful for performing the desired operations as described above. In some embodiments, application 522 can be arranged to operate with program data 524 on an operating system 521 such that the overall system performs one or more specific variations of techniques as discussed herein. This described basic configuration is illustrated in FIG. 4 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims:

The invention claimed is:

1. A system for executing tasks in a computing resource environment, the system comprising:
   a first scheduler partition, the first scheduler partition being associated with a first scheduler running on one or more processors of the system, first scheduler state information, and a first plurality of computing resources;
   a second scheduler partition, the second scheduler partition being associated with a second scheduler running on the one or more processors, second scheduler state information, and a second plurality of computing resources;
   a task distributor running on the one or more processors and configured to distribute tasks to the first and second scheduler partitions;
   the first scheduler being configured such that, responsive to the first scheduler partition receiving a task from the task distributor, the first scheduler allocates a computing resource for execution of the received task and updates the first scheduler state information accordingly; and
   the task distributor being configured such that, responsive to a determination of the first scheduler state information indicating that the first scheduler is in a failed or corrupted state, the task distributor stops distributing tasks to the first scheduler partition and prevents the first scheduler state information from propagation to, or access by, the second scheduler partition when the second scheduler is not in a failed or corrupted state by isolating the first scheduler and sequestering its state information from the second scheduler, the first scheduler state information subsequently processed by the task distributor.

2. The system of claim 1, the task distributor being configured to:
   identify a first task as a fault-tolerant task meant to tolerate scheduler failures;
   distribute the identified first task to the first scheduler partition; and
   distribute a first replicated task to the second scheduler partition, the first replicated task being a replica of the identified first task.

3. The system of claim 1, the system further comprising a source of task routing information;
   the distributor being configured to distribute tasks to the scheduler partitions based on the task routing information.

4. The system of claim 3, the distributor being configured to update the task routing information based on the scheduler state information associated with the respective scheduler partitions; and
   in response to determining that the first scheduler state information indicates that the first scheduler is in a failed or corrupted state, the distributor updates task routing information to indicate that the first scheduler partition may not receive distributed tasks from the distributor.

5. The system of claim 3, the task routing information including a distribution key associated with each task to be distributed by the distributor; and
   the distributor being configured to distribute tasks based on a distribution sequence indicated by the distribution key of each task.

6. The system of claim 1, where the first plurality of computing resources includes a plurality of machine sets, each machine set representing computing resources associated with or based on at least one hardware component of a computing device.

7. The system of claim 1, the distributor being configured to distribute tasks to the first and second scheduler partitions based on a respective resource utilization level in the first and second scheduler partitions, the resource utilization level of a scheduler partition being indicated based on the scheduler state information associated with that scheduler partition.

8. The system of claim 1, where the first scheduler state information includes information about resource outages occurring in the first plurality of computing resources.

9. The system of claim 8, the distributor being configured to distribute tasks to the scheduler partitions based on a respective computing capacity of each scheduler partition, the computing capacity of a scheduler partition being determined based on the scheduler state information.

10. The system of claim 9, the scheduler state information including information about a total number of tasks being executed within the scheduler partition and a total computing resource usage level associated with the tasks being executed from among the first plurality of computing resources.

11. The system of claim 1, the system further comprising:
a third scheduler partition, the third scheduler partition being associated with a third scheduler, third scheduler state information, and a third plurality of computing resources; and
in response to determining that the first scheduler state information indicates that the first scheduler is in a failed or corrupted state, the distributor stops distributing tasks to the first scheduler partition and prevents the first scheduler state information from being propagated to or accessed by the second or third scheduler partitions.

12. The system of claim 11, where each scheduler partition is configured to be internally fault tolerant such that an outage of a computing resource allocated for execution of a task within a scheduler partition causes the scheduler to allocate a new computing resource for execution of that task; and
where each scheduler partition is configured to be isolated from the other scheduler partitions such that scheduler state information, tasks, and resources associated with a scheduler in a corrupted or failed state are prevented from being propagated to the other scheduler partitions; and
where remaining instances tasks replicated across two or more scheduler partitions are updated in response to a scheduler of one of said two or more scheduler partitions being in a failed or corrupted state.

13. The system of claim 1, the first scheduler partition being uniquely associated with the first scheduler; and
the second scheduler partition being uniquely associated with the second scheduler.

14. A method of preventing cascading scheduler failures in a system for executing tasks in a computing resource environment, the method comprising:
distributing a first task from a task distributor to one of at least a first scheduler partition and a second scheduler partition in the computing resource environment the second scheduler partition being associated with a second scheduler and a second plurality of computing resources;
in response to receiving the first task from the task distributor, allocating, with a first scheduler of the first scheduler partition, a computing resource for execution of the received first task from among a first plurality of computing resources associated with the first scheduler partition;
in response to said allocating, updating, with the first scheduler, first scheduler state information, the updated first scheduler state information being indicative of a state of the first scheduler, the received first task, and the allocated computing resource after said allocating; and
in response to determining that the first scheduler state information indicates that the first scheduler is in a failed or corrupted state,
stopping distribution of tasks by the distributor to the first scheduler partition, and
preventing the first scheduler state information from being propagated to or accessed by the second scheduler partition when the second scheduler is not in a failed or corrupted state by isolating the first scheduler and sequestering its state information from the second scheduler, the first scheduler state information subsequently processed by the task distributor.

15. The method of claim 14, distributing a first task from a distributor including distributing the first task to the first scheduler partition based on task routing information.

16. The method of claim 15, the method further comprising:
updating the task routing information based on the updated first scheduler state information; and
in response to determining that the first scheduler state information indicates that the first scheduler is in a failed or corrupted state, updating the task routing information to indicate that the first scheduler partition may not receive distributed tasks from the distributor.

17. The method of claim 15, the task routing information including a distribution key associated with each task to be distributed by the distributor; and
the distribution of tasks including distributing tasks based on a distribution sequence indicated by the distribution key of each task.

18. The method of claim 14, where the first plurality of computing resources includes a plurality of machine sets, each machine set representing computing resources associated with or based on at least one hardware component of a computing device.

19. The method of claim 14, distributing a first task from a distributor including:
distributing the first task to one of the first and second scheduler partitions based on a respective resource utilization level in the first and second scheduler partitions, the resource utilization level of a scheduler partition being indicated based on scheduler state information associated with that scheduler partition.

20. The method of claim 14, where the first scheduler state information includes information about resource outages occurring in the first plurality of computing resources.

21. The method of claim 20, distributing a first task from a distributor including:
distributing the first task to one of the first and second scheduler partitions based on a respective computing capacity of each scheduler partition, the computing capacity of a scheduler partition being determined based on the scheduler state information associated with that scheduler partition.

22. The method of claim 21, the scheduler state information including information about a total number of tasks being executed within a particular scheduler partition and a total computing resource usage level associated with the tasks being executed from among a plurality of computing resources associated with the particular scheduler partition.

23. The method of claim 14, the method further comprising:
in response to determining that the first scheduler state information indicates that the first scheduler is in a failed or corrupted state, preventing the first scheduler state information from being copied to or accessed by a third scheduler partition, the third scheduler partition being associated with a third scheduler and a third plurality of computing resources.

24. The method of claim 23, where each scheduler partition is configured to be internally fault tolerant such that an outage of a computing resource allocated for execution of a task within a scheduler partition causes the scheduler to allocate a new computing resource for execution of that task; and where each scheduler partition is configured to be isolated from the other scheduler partitions such that scheduler state information, tasks, and resources associated with a scheduler in a corrupted or failed state are prevented from being propagated to the other scheduler partitions; and the method further comprising: updating remaining instances tasks replicated across two or more scheduler partitions in response to a scheduler of one of said two or more scheduler partitions being in a failed or corrupted state.

25. The method of claim 14, distributing a first task from a distributor including:

identifying the first task as a fault-tolerant task meant to tolerate scheduler failures;

replicating the identified first task by creating a first replicated task;

distributing the identified first task to the first scheduler partition with the distributor; and distributing the first replicated task to the second scheduler partition with the distributor.

26. A system for executing tasks in a computing resource environment, the system comprising:

a first scheduler partition, the first scheduler partition being uniquely associated with a first scheduler running on one or more processors of the system, first scheduler state information, and a first plurality of computing resources;

a second scheduler partition, the second scheduler partition being uniquely associated with a second scheduler running on the one or more processors, second scheduler state information, and a second plurality of computing resources;

a third scheduler partition, the third scheduler partition being uniquely associated with a third scheduler running on the one or more processors, third scheduler state information, and a third plurality of computing resources; and a task distributor running on the one or more processors and configured to distribute tasks to the first and second scheduler partitions and to determine a state of a scheduler partition based on the scheduler state information of that scheduler partition;

the first, second, and third scheduler partitions being configured such that each scheduler and scheduler partition may exchange information with the task distributor, and no scheduler or scheduler partition may directly transmit scheduler state information to or receive scheduler state information directly from any other scheduler or scheduler partition;

the first scheduler being further configured such that, responsive to the first scheduler partition receiving a task from the task distributor, the first scheduler allocates a computing resource for execution of the received task and updates the first scheduler state information accordingly; and the task distributor being configured such that, responsive to a determination of the first scheduler state information indicating that the first scheduler is in a failed or corrupted state, the task distributor stops distributing tasks to the first scheduler partition and prevents the first scheduler state information from propagation to, or access by, the second or third scheduler partitions when the second scheduler and third scheduler are not in a failed or corrupted state by isolating the first scheduler and sequestering its state information from the second scheduler and third scheduler, the first scheduler state information subsequently processed by the task distributor.

* * * * *